Feb. 25, 1930.　　C. A. RUESENBERG　　1,748,148
FRICTION CLUTCH
Filed June 6, 1928
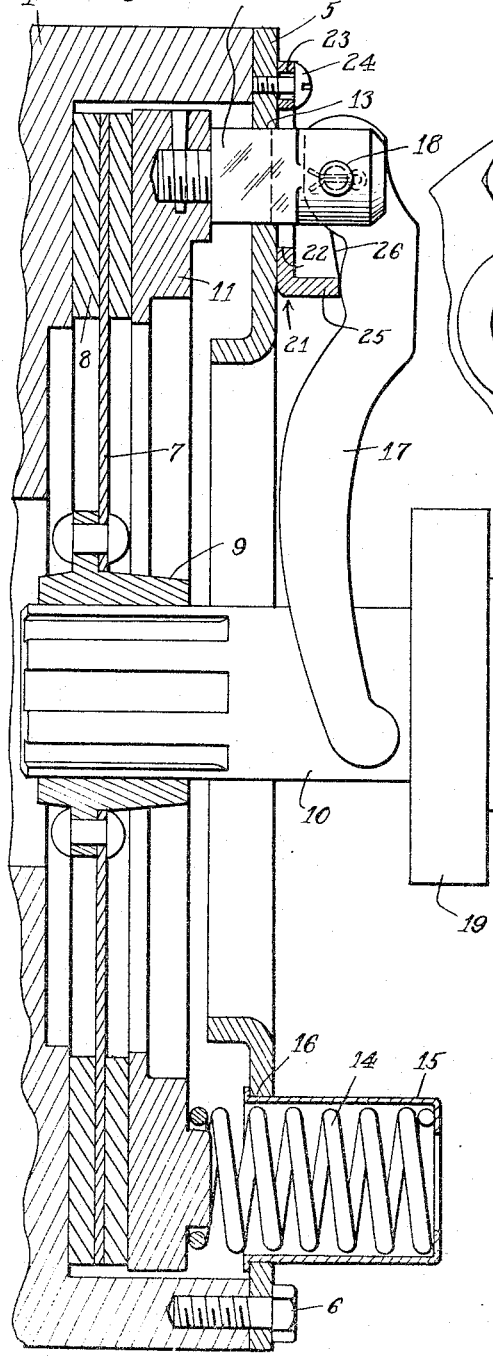
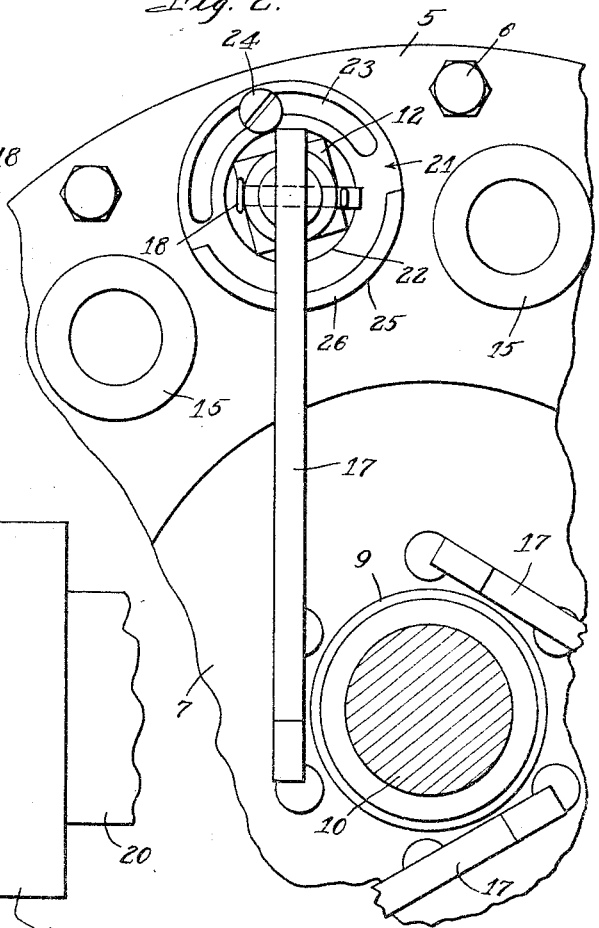
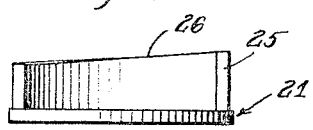
Inventor:
Carl A. Ruesenberg.
By Wilson & McCanna
Attys.

Patented Feb. 25, 1930

1,748,148

UNITED STATES PATENT OFFICE

CARL A. RUESENBERG, OF ROCKFORD, ILLINOIS, ASSIGNOR, BY MESNE ASSIGNMENTS, TO BORG-WARNER CORPORATION, OF CHICAGO, ILLINOIS, A CORPORATION OF ILLINOIS

FRICTION CLUTCH

Application filed June 6, 1928. Serial No. 283,211.

This invention relates to improvements in friction clutches and more particularly those adapted for use in motor vehicles.

Friction clutches, as heretofore constructed, utilized various types of take-up adjustments, all of a more or less complicated and expensive construction, unhandy to manipulate, and apt to give uneven adjustment unless particular care was exercised and the mechanic possessed a fair amount of skill. It is, therefore, the principal object of my invention to provide an improved form of adjustment which, in addition to being simpler and more economical to make, enables very close and accurate adjustment of the clutch by the average mechanic in a fraction of the time otherwise necessitated, the adjustment being very handy to manipulate and lock in adjusted condition.

The clutch adjustment of my invention is particularly designed and adapted for use with push type clutches, these being most widely adopted at the present time, and comprises cam plates arranged to be mounted on the back plate over the studs which project through the back plate from the pressure plate and have the clutch release levers pivoted thereon, as is well known in this art. Each cam plate is arranged for rotation about its stud as a center to any adjusted position and suitably has a screw entered through an arcuate slot therein for fastening the same rigidly in adjusted position, the adjustment of the plate serving to bring the proper part of an inclined cam surface provided thereon against the clutch release lever to serve as the fulcrum therefor.

The invention is fully described in connection with the accompanying drawing, in which—

Figure 1 is a central longitudinal section through a friction clutch embodying my invention;

Fig. 2 is a fragmentary rear view of Fig. 1; and

Fig. 3 is an isolated view of one of the cam plates.

The same reference numerals are applied to corresponding parts in the three views.

The clutch in connection with which I have chosen to illustrate my invention is of purely conventional construction and comprises a fly-wheel 4 provided with a back plate 5, fastened thereto, as by means of bolts 6, and clutch plate 7 provided with the usual pads or facings 8 and having the hub 9 thereof splined on the driven shaft 10. A pressure plate 11 suitably held against turning with reference to the fly-wheel 4, as, for example, by means of its studs 12, which are square in cross-section and are slidably received in square holes 13 in the back plate 5, has a plurality of compression springs 14 acting against the back thereof and seated in sheet metal cups 15 mounted in holes 16 in the back plate 5, normally to hold the clutch engaged so as to transmit power from the fly-wheel 4 to the shaft 10. Three studs 12 are usually employed having release levers 17 pivoted to the outer ends thereof, as represented at 18, the said levers being arranged to fulcrum about points intermediate the ends thereof when engaged at their inner ends by the thrust bearing 19 provided on the front end of the throw-out sleeve 20 operated in the usual manner by a pedal-actuated yoke (not shown). The fulcrum or rocking motion communicated to the levers 17 causes the pressure plate 11 to be retracted and the springs 14 to be accordingly compressed so that the clutch is released, the fly-wheel 4 being then allowed to turn independently of the shaft 10.

As stated before, various forms of adjustable means were provided in connection with the release levers by means of which adjustments could be made to take up for wear, said adjustments being invariably of a more or less complicated and expensive construction and, moreover, unhandy to manipulate. The cam plates 21 provided in accordance with my invention afford a clutch adjustment of an obviously simpler and more economical construction, and, as will presently appear, are extremely handy to manipulate and permit of complete adjustment of the clutch in a fraction of the amount of time otherwise necessitated. The plates 21 are of identical form so that a description of one will suffice for all, it being understood that there is one plate for each of the three studs 12. Each plate has a round center hole 22 fitting the square shank of the stud 12, as best appears in Fig. 2, so that the plate may be turned about the stud as a center when the adjustment presently to be described is being made. The cam plate has an arcuate slot 23 concentric with the hole 22 receiving a screw 24 threading in the back plate 5 whereby the cam plate may be fastened rigidly in adjusted position. The hole 22 and slot 23 are preferably punched since it is intended that the plate shall be struck from sheet metal for economy in production. One edge of the plate is struck up in the form of an arcuate flange 25 the edge 26 of which is cut on an incline, as best appears in Fig. 3, to provide a substantially spiral cam surface arranged to serve as the fulcrum for the release lever 17 associated therewith. It will be evident that since all of the plates 21 are of substantially identical form, being made in quantities in the same dies, the fulcrums will all be spaced uniformly with reference to the studs 12 and since the flanges 25 are of arcuate form and concentric with the center holes 22, the rotary adjustment of the plates does not disturb this spaced relationship. The rotary adjustment of the plates, however, varies the spacing of the fulcrums with reference to the back plate 5 because of the inclination of the edge 26 of each of the flanges 25 and accordingly permits take-up for wear in the clutch.

In operation, when the clutch is to be adjusted the inspection plate on the fly-wheel housing is removed. This affords a good view of each of the release levers 17 and the thrust bearing 19 on the end of the throw-out sleeve 20. One after another of the levers is brought into position by turning the engine over, as is well known, and its cam plate is arranged to be adjusted until there is a certain prescribed clearance between the inner end of the lever and the thrust bearing 19 with the clutch engaged and the throw-out sleeve 20 in corresponding position. Any wear in the clutch will reduce the normal clearance as is believed to be apparent. Hence, the plates 21 are adjusted in a clockwise direction, as viewed in Fig. 2, to bring a lower point on the inclined edge 26 under each lever 17 so as to reproduce the proper amount of clearance between the inner end of the levers and the thrust bearing 19. In the adjusting of each plate it will be evident that the screw 24 has to be loosened and that the turning of the plate can then be accomplished by tapping the same at one end of the flange 25 with the screw driver. Then, when the proper amount of adjustment has been made the screw 24 can be tightened again. It will be seen that only one tool is required and that the adjustment of the entire clutch can easily be completed in a few minutes, each lever having its cam plate adjusted until the inner end of the lever has the prescribed amount of clearance between it and the bearing 19.

It is believed the foregoing description conveys a clear understanding of my invention and of its various important advantages. The appended claims have been drawn with a view to covering all legitimate modifications and adaptations which will undoubtedly occur to those skilled in the art to which the invention relates as a result of this disclosure.

I claim:

1. In a friction clutch comprising a driving member, such as a fly-wheel, a driven member, such as a clutch disk, a spring-actuated pressure plate for frictionally engaging the driving and driven members, a back plate having studs projecting therethrough and mounted on the pressure plate, and release levers pivoted on the outer ends of said studs and arranged to have rocking motion communicated thereto to retract the pressure plate against the action of its springs, of a plurality of adjustable means providing a fulcrum for each of said levers, each means comprising a separately adjustable cam plate at each of said studs mounted on the back plate beneath the release lever associated with the stud, the same having an inclined cam surface disposed under the release lever to afford a fulcrum for said lever, separate guiding means for the cam plate whereby the same is arranged to be movable to different adjusted positions while maintaining a constant spaced relation between the fulcrum and the stud to bring a higher or lower point of said inclined surface in contact with said lever, and means for fastening said cam plate in adjusted position on the back plate.

2. In a friction clutch comprising a driving member, such as a fly-wheel, a driven member, such as a clutch disk, a spring-actuated pressure plate for frictionally engaging the driving and driven members, a back plate having studs projecting therethrough and mounted on the pressure plate, and release levers pivoted on the outer ends of said studs and arranged to have rocking motion communicated thereto to retract the pressure plate against the action of its springs, of a plurality of adjustable means providing a fulcrum for each of said levers, each means comprising a cam plate mounted on the back plate adjacent a stud and having an inclined cam surface disposed under the release lever associated with the stud to serve as a fulcrum therefor, said plate being slotted to permit movement thereof to different positions of adjustment to bring a higher or lower point of the cam surface in contact with said lever, the movement of said plate being such that a constant spaced relationship between the fulcrum and the stud is maintained, and a screw threading in the back plate and entered through the slot of the cam plate arranged to fasten the latter in adjusted position.

3. In a friction clutch comprising a driving member, such as a fly-wheel, a driven member, such as a clutch disk, a spring-actuated pressure plate for frictionally engaging the driving and driven members, a back plate having studs projecting therethrough and mounted on the pressure plate, and release levers pivoted on the outer ends of said studs and arranged to have rocking motion communicated thereto to retract the pressure plate against the action of its springs, of a plurality of adjustable means providing a fulcrum for each of said levers, each means comprising a plate having a center hole to receive a stud and mounted on the back plate beneath the release lever associated with the stud, the same having an arcuate and substantially spiral cam surface provided thereon concentric with the center hole arranged to bear against the lever and serve as a fulcrum therefor, said plate being arranged to be turned to different positions of adjustment to bring a higher or lower point of the cam surface in contact with the lever for the purpose herein described, and means for securing said plate in adjusted position.

4. In a friction clutch comprising a driving member, such as a fly-wheel, a driven member, such as a clutch disk, a spring-actuated pressure plate for frictionally engaging the driving and driven members, a back plate having studs projecting therethrough and mounted on the pressure plate, and release levers pivoted on the outer ends of said studs and arranged to have rocking motion communicated thereto to retract the pressure plate against the action of its springs, of a plurality of adjustable means providing a fulcrum for each of said levers, each means comprising a plate having a center hole to receive a stud and mounted on the back plate beneath the release lever associated with the stud, the same having an arcuate and substantially spiral cam surface provided thereon concentric with the center hole arranged to bear against the lever and serve as a fulcrum therefor, said plate being arranged to be turned to different positions of adjustment to bring a higher or lower point of the cam surface in contact with the lever for the purpose herein described, said plate also having an arcuate slot therein concentric with the center hole, and a screw threading in the back plate entered through said slot and arranged to be tightened to secure said plate in adjusted position.

5. In a friction clutch comprising a driving member, such as a fly-wheel, a driven member, such as a clutch disk, a spring-actuated pressure plate for frictionally engaging the driving and driven members, a back plate having studs projecting therethrough and mounted on the pressure plate, and release levers pivoted on the outer ends of said studs and arranged to have rocking motion communicated thereto to retract the pressure plate against the action of its springs, of a plurality of adjustable means to serve as a fulcrum for each of said levers, each means comprising a cam plate struck from sheet metal providing a center hole to receive a stud with the plate mounted on the back plate beneath the release lever associated with the stud, one edge of said plate being struck up in the form of an arcuate flange concentric with the center hole, the free edge of said flange being cut on an incline to provide a substantially spiral cam surface, the same being arranged to engage under the release lever to serve as a fulcrum therefor and arranged when turned to different positions of adjustment to provide a higher or lower fulcrum point for said lever, and means for securing said plate in adjusted position.

6. In a friction clutch comprising a driving member, such as a fly-wheel, a driven member, such as a clutch disk, a spring-actuated pressure plate for frictionally engaging the driving and driven members, a back plate having studs projecting therethrough and mounted on the pressure plate, and release levers pivoted on the outer ends of said studs and arranged to have rocking motion communicated thereto to retract the pressure plate against the action of its springs, of a plurality of adjustable means to serve as a fulcrum for each of said levers, each means comprising a cam plate struck from sheet metal providing a center hole to receive a stud with the plate mounted on the back plate beneath the release lever associated with the stud, one edge of said plate being struck up in the form of an arcuate flange concentric with the center hole, the free edge of said flange being cut on an incline to provide a substantially spiral cam surface, the same being arranged to engage under the release lever to serve as a fulcrum therefor and arranged when turned to different positions of adjustment to provide a higher or lower fulcrum point for said lever, the plate also having an arcuate slot punched therein approximately concentric with the center hole on the diametrically opposite side from the aforesaid flange and arranged to receive a screw threading in the back plate whereby to permit fastening said plate in adjusted position.

7. In a friction clutch, the combination with a driving member, such as a fly-wheel, a driven member, such as a clutch disc, a back plate, and a pressure plate having spring means acting between the same and the back plate normally to hold the driving and driven members in engagement, there being studs threaded in the pressure plate having square shanks slidably received in square holes provided in the back plate, and also release levers pivoted on the free ends of said studs and arranged to have rocking motion communicated thereto to retract the pressure plate against the action of its spring means, of a plurality of adjustable means providing a fulcrum for each of said levers, each means comprising a rotary cam plate having a center hole fitting over the square shank of a stud and mounted on the back plate beneath the release lever associated with the stud, the center hole being round to permit turning of said plate relative to said stud to different positions of adjustment, said plate having one edge thereof formed with an arcuate inclined and substantially spiral cam surface approximately concentric with the center hole, the same being disposed under the release lever to serve as a fulcrum therefor and being arranged in the turning of said plate to have a higher or lower point thereof brought in contact with said lever for the purpose described, and means for securing said plate in adjusted position.

In witness of the foregoing I affix my signature.

CARL A. RUESENBERG.